United States Patent [19]

Haynes et al.

[11] Patent Number: 5,888,987
[45] Date of Patent: Mar. 30, 1999

[54] SOLVENT DRIED POLYSACCHARIDE SPONGES

[75] Inventors: Carla Anne Haynes, Broadwas; Elaine Lorimer, Cumbernauld, both of United Kingdom

[73] Assignee: Johnson & Johnson Medical, Inc., Arlington, Tex.

[21] Appl. No.: 963,106

[22] Filed: Nov. 3, 1997

[30] Foreign Application Priority Data

Oct. 28, 1996 [GB] United Kingdom .................... 9622394

[51] Int. Cl.$^6$ .......................... A61K 31/715; A61F 13/00
[52] U.S. Cl. ............................. 514/54; 424/443; 514/54; 514/55; 514/56; 514/57; 514/58; 514/59; 514/60; 536/123; 536/123.1
[58] Field of Search ................................. 514/54, 55, 56, 514/57, 58, 59, 60; 536/123, 123.1; 424/443

[56] References Cited

U.S. PATENT DOCUMENTS

| | | | |
|---|---|---|---|
| 4,292,972 | 10/1981 | Pawelchak et al. | 128/296 |
| 4,689,118 | 8/1987 | Makoui et al. | 162/100 |
| 5,104,411 | 4/1992 | Makoui et al. | 8/116.4 |
| 5,409,703 | 4/1995 | McAnalley et al. | 424/435 |
| 5,470,576 | 11/1995 | Patel | 424/445 |
| 5,660,857 | 8/1997 | Haynes et al. | 424/450 |

FOREIGN PATENT DOCUMENTS

| | | |
|---|---|---|
| 0 343 459 | 12/1989 | European Pat. Off. . |
| 562864 | 9/1993 | European Pat. Off. . |
| 2 301 362 | 5/1995 | United Kingdom . |

OTHER PUBLICATIONS

Oungbho et al. *Int. J. Pharm.*, vol. 156(2):229–237, (1997). Abstract Only.

Dumitriu et al. "Hydrogel Based Polysaccharides" From *Polysaccharides in Medicinal Applications*, ed. by Dumitriu, Severian; Marcel Dekker, pp. 125–171, (1996).

Dumitriu et al. "Hydrogels as Support For Drug Delivery Systems", Ibid. (pp. 705–717).

UK Search Report Application No. GB 9622394.6, 16 Jan. 1997, JJM–262.

*Primary Examiner*—Howard C. Lee
*Attorney, Agent, or Firm*—Andrew C. Farmer

[57] ABSTRACT

The invention provides a method of preparing water-insoluble polysaccharide sponges, and sponges obtained by means of the method. The method comprises: (a) providing an aqueous solution of a soluble polysaccharide; (b) freezing the solution; (c) treating the frozen solution with a water-miscible organic solvent such as isopropanol to effect solvent exchange for the water in the frozen solution; and (d) drying the resulting polysaccharide material. The organic solvent contains a cross-linking agent such as calcium chloride to render the polysaccharide water-insoluble in the solvent-exchange step (c). The resulting materials are more conformable and less friable than freeze-dried polysaccharide sponges.

21 Claims, No Drawings

SOLVENT DRIED POLYSACCHARIDE SPONGES

This invention relates to polysaccharide sponges, and to methods of making such sponges. polysaccharide sponges made according to the method of the present invention are suitable for use as wound dressing materials.

Wound dressings comprising collagen sponges are commercially available under the Registered Trade Mark Fibracol. These materials are made by dispersing collagen in an aqueous medium, and then freeze drying the dispersion in order to remove water.

U.S. Pat. No. 3,157,524 describes a method of making collagen sponge materials comprising the steps of: forming an aqueous dispersion of collagen; freezing the dispersion; treating the frozen dispersion in a series of anhydrous isopropanol baths to exchange isopropanol for the water in the frozen dispersion; followed by drying. There is no disclosure of preparing polysaccharide sponges by this method.

Wound dressings comprising polysaccharides, and in particular alginates, in the form of fibrous mats, fibrous ropes, aqueous gels or films are known. For example, alginate-based wound dressing pads are available under the Registered Trade Marks Kaltostat and Sorbsan. Alginates are particularly useful as wound dressing materials, because of their well-established haemostatic properties and high biological acceptability.

The known alginate dressings use calcium alginate or mixed calcium/sodium alginates. Calcium alginate is insoluble in water, but sodium alginate is readily soluble. The solubility of an alginate wound dressing material can therefore be adjusted by appropriate control of the ratio of calcium:sodium ions.

A soft, conformable polysaccharide sponge can be prepared by freeze drying a solution of a soluble polysaccharide such as sodium alginate. However, such a sponge is of limited value as a wound dressing material, because of its solubility in wound exudate.

Freeze drying a dispersion of calcium alginate in water also leads to a sponge which is unsuitable for use as a wound dressing material, because it is extremely friable.

The present invention is based on the surprising discovery that a polysaccharide sponge which is prepared by treatment of a frozen aqueous solution of soluble polysaccharide with a cross-linking agent dispersed in a hygroscopic non-aqueous solvent followed by drying is soft and highly conformable with minimal tendency to shed particles or fibres in use. It is therefore well suited for use as a wound dressing material.

The present invention provides a method for preparing a polysaccharide sponge, comprising the steps of: (a) providing a solution of soluble polysaccharide in water; (b) freezing the solution to form a frozen solution; (c) immersing the frozen solution in a water-miscible organic solvent containing a cross-linking agent to exchange said solvent for at least a part of the water in the frozen solution while cross-linking the polysaccharide to render it water insoluble; and (d) drying the resulting cross-linked and solvent-exchanged polysaccharide material.

The soluble polysaccharide used in step (a) is preferably selected from the group consisting of soluble alginates such as sodium alginate, xanthan gum, guar gum, locust bean gum, chitosan, carboxymethyl cellulose salts, hydroxyethyl cellulose, hyaluronic acid, pectin, and mixtures thereof.

Preferably, the soluble polysaccharide (and hence the final polysaccharide sponge product) comprises at least 25% by weight of alginate, more preferably at least 75% by weight of alginate, and most preferably it consists essentially of alginate.

The cross-linking agent used in step (c) may be any ionic or covalent cross-linking agent. Preferred cross-linking agents are selected from the group consisting of glutaraldehyde, dicyclohexyl carbodiimide, hexamethylene diisocyanate, salts of multivalent cations, salts of multivalent anions, and mixtures thereof. The particular cross-linking agent used will depend on the nature of the soluble polysaccharide. For example, soluble alginates such as sodium alginate are preferably cross-linked by the addition of multivalent cations, such as divalent or trivalent metal cations in the form of salts, in particular calcium chloride or zinc chloride. These chlorides are soluble in organic solvents. On the other hand, guar gum is preferably cross-linked by reaction with polyanions, especially borate or phosphate anions. Likewise, chitosan can be cross-linked by reaction with borate or phosphate ions, such as sodium tripolyphosphate or sodium tetraborate.

The present invention also provides a substantially water-insoluble polysaccharide sponge obtainable by a method according to the invention. The present invention further provides a wound dressing or implant comprising such a sponge.

Typically, the polysaccharide will be dissolved in the aqueous medium in an amount ranging from 0.2% to 5% w/v, and more preferably from 0.5% to 3% w/v. For example, the solution used in step (a) may contain polysaccharide in an amount of approximately 1% w/v.

The key step in the process according to the present invention is the solvent exchange and cross-linking step (c). It has been found that exchanging the water in the frozen polysaccharide solutions by a volatile solvent at the same time as cross-linking the polysaccharide to render it insoluble, followed by drying under relatively mild conditions, results in the formation of polysaccharide sponges with superior physical properties. The resulting sponges are softer, more conformable and less friable than polysaccharide sponges produced by freeze drying insoluble polysaccharide suspensions. Furthermore, the methods according to the present invention are faster, less energy-intensive, and more suited to continuous production than freeze-drying.

Preferably, the organic solvent is a hygroscopic, volatile organic solvent such as a substantially anhydrous $C_1$–$C_5$ monohydric alcohol or a $C_3$–$C_6$ ketone, or mixtures thereof. Preferred solvents include ethanol, propanol, isopropanol, n-butanol, isobutanol, t-butyl alcohol, amyl alcohol and acetone. Most preferred is anhydrous isopropanol.

The solvent baths may be at any temperature at which the organic solvent is liquid, but they are preferably at or near ambient temperature (0°–30° C.). This results in solvent exchange and cross-linking taking place simultaneously with thawing of the frozen polysaccharide dispersion.

Preferably, the solvent exchange step is carried out in two or more successive baths of the organic solvent. The second and subsequent solvent baths may also contain the cross-linking agents. The use of multiple solvent baths results in more complete exchange of the organic solvent for water in the polysaccharide material, thereby reducing drying time and energy, and giving a product with better physical properties.

Typically, the volume of each bath of organic solvent used to wash 1 litre of frozen polysaccharide solution or suspension will be from 0.5 to 10 litres, preferably from 1 to 5 litres. Following the washing step, it will usually be appropriate to dry the alginate sponge in air at ambient temperature up to 80° C. or under reduced pressure, optionally with a preliminary squeezing or blotting step to remove excess solvent.

When a multivalent anion or cation salt is used as the cross-linking agent in the organic solvent, it is preferably present in an amount from 0.1 to 50% w/v, and more preferably from 1% to 20% w/v. The preferred salts are anhydrous calcium chloride and sodium tetraborate. Anhydrous zinc chloride and sodium tripolyphosphate may also be used.

The polysaccharide used in the method of the present invention may be modified prior to forming the sponge. For example, the polysaccharide may be partially crosslinked using conventional crosslinking agents, or it may be combined with other biopolymers which are appropriate for use in wound dressing materials. For example, mixtures of alginate with chitosan, xanthan gum, guar gum or pectin may be used.

Specific embodiments of the present invention will now be described further, by way of example, as follows:

EXAMPLE 1

A 10 ml sample of a solution of sodium alginate (LVG 008 281 05, molecular weight 200,000–250,000, mannuronic acid/guluronic acid ratio of 0.45 supplied by Pronova Biopolymer, Drammen, Norway) at a concentration of 1% w/v in deionised water is blast frozen at −30° C. for 30 minutes. The frozen block is immersed in 20 ml of anhydrous isopropanol containing 10% w/v of anhydrous $CaCl_2$ and shaken for 2 hours at 25°C. until defrosted. The resulting material is removed from the isopropanol bath, blotted with absorbent tissue, and then dried in air at 60° C. overnight. The resulting material is a white, soft, flexible sponge having low friability, and low solubility in water.

EXAMPLE 2

The procedure of Example 1 is repeated, but with the final drying step carried out under vacuum at 25° C. overnight. A substantially similar product is obtained as in Example 1.

EXAMPLE 3

The procedure of Example 1 is repeated, but with a second solvent treatment step prior to the final drying step. The second solvent treatment step is carried out in a second 20 ml bath of fresh anhydrous isopropanol containing 20% w/v anhydrous $CaCl_2$. A substantially similar product is obtained as in Examples 1 and 2.

EXAMPLE 4

The procedure of Example 3 is repeated, but with no $CaCl_2$ present in the second 20 ml bath of fresh anhydrous isopropanol. A substantially similar product is obtained as in Examples 1–3.

EXAMPLE 5

The procedure of Example 3 is repeated, but with a third solvent treatment step prior to the drying step. The third solvent treatment step is carried out in a third 20 ml bath of fresh anhydrous isopropanol containing 20% w/v $CaCl_2$. A product substantially similar to those in the previous Examples is obtained.

EXAMPLE 6

The procedure of Example 5 is repeated, but with no $CaCl_2$ present in the third solvent bath. A product substantially similar to those in the previous examples is obtained.

EXAMPLE 7

The procedure of Example 1 is repeated, but with replacement of the 1% alginate solution by an aqueous solution containing 0.5% w/v alginate and 0.5% w/v chitosan. The solvent exchange bath contains 1% w/v $CaCl_2$ in anhydrous isopropanol. The resulting material is soft, flexible and absorbent.

EXAMPLE 8 (Comparative Example)

A 10 ml sample of a suspension of 1% w/v calcium alginate fibers in water is blast frozen at −30° C. for 30 minutes.

The frozen suspension is freeze-dried overnight at −20° C. to 25° C. The resulting material is soft, but friable. It breaks when bent and sheds fibers to the touch.

EXAMPLE 9

The procedure of Example 1 is repeated, but with replacement of the sodium alginate by guar gum, and with replacement of the calcium chloride cross-linking agent by sodium tetraborate. The product is a soft, conformable, insoluble sponge.

EXAMPLE 10

The procedure of Example 9 is repeated, but with replacement of the guar gum by a mixture of 50% w/w guar gum and 50% w/w xanthan gum. A similar product to that of Example 9 is obtained.

EXAMPLE 11

The procedure of Example 10 is repeated, but with replacement of the sodium tetraborate cross-linking agent by calcium chloride, as in Example 1. A similar product to that of Example 10 is obtained.

EXAMPLE 12

The integrity of the sponges prepared as above was assessed as follows: A square (1.5×1.5 cm) of each sponge sample was added to 10 ml of culture medium (Dulbecco's modification of Eagles medium supplemented with 10% foetal calf serum) in a 30 ml Sterilin® container. Initial observations were made, and the samples were then incubated at 37° C. Further observations were made at 6, 22 and 174 hours.

It was found that the solvent dried, cross-linked samples prepared as specified in Example 1 swelled in the serum at ambient temperature, but remained intact. After 7 days, one or two small fibers of the material were visible in the solution, but the integrity of the bulk material was substantially maintained.

In contrast, a sodium alginate sponge prepared by freeze drying without any cross-linking step was completely dissolved in the solution after 7 hours. A calcium alginate sponge produced by freeze drying a dispersion of calcium alginate as described in Example 8 started to disintegrate as soon as it was placed in the solution. After 20 hours several large fragments of the sponge were floating in the solution, and after 72 hours there were many free calcium alginate fibers in the solution.

EXAMPLE 13

The absorbency of the sponges prepared according to the present invention is evaluated as follows.

A number of samples of sponge (50: 50 chitosan:alginate cross-linked with calcium chloride) prepared by the method of Example 7 were weighed, immersed in phosphate buffered saline solution at 37° C. for 30 minutes and then weighed again. The liquid absorption due to immersion was found to increase the weight of the samples by a factor of 21.7±3.5.

A number of comparative samples of sponge (50:50 chitosan:calcium alginate) prepared by a process analogous to that in Example 8 were similarly tested. The liquid absorption due to the immersion was found to increase the weight of the samples by a factor of 14.2±3.7.

The above examples are intended for the purpose of illustration the scope of the accompanying claims will be apparent to the skilled reader.

We claim:

1. A method of preparing a polysaccharide sponge, comprising the steps of:
   (a) providing a solution of a soluble polysaccharide in water;
   (b) freezing the solution to form a frozen solution;
   (c) immersing the frozen solution in a water-miscible organic solvent containing a cross-linking agent to exchange said solvent for at least a part of the water in the frozen solution while cross-linking the polysaccharide to render it water insoluble; and
   (d) drying the resulting cross-linked and solvent-exchanged polysaccharide material.

2. The method according to claim 1, wherein the soluble polysaccharide is selected from the group consisting of soluble alginates, xanthan gum, guar gum, chitosan, carboxymethyl cellulose, hydroxymethyl cellulose, hyaluronic acid, pectin and mixtures thereof.

3. The method according to claim 1, wherein the soluble polysaccharide comprises at least 25% by weight of one or more alginates.

4. The method according to claim 3, wherein the soluble polysaccharide comprises at least 75% by weight of one or more alginates.

5. The method according to claim 1, wherein the cross-linking agent is selected from the group consisting of glutaraldehyde, dicyclohexyl carbodiimide, hexamethylene diisocyanate, salts of multivalent cations and salts of multivalent anions.

6. The method according to claim 5, wherein the cross-inking agent is a salt of a divalent or trivalent metal cation.

7. The method according to claim 6, wherein the cross-inking agent is calcium chloride or zinc chloride.

8. The method according to claim 5, wherein the cross-inking agent comprises a borate or a phosphate.

9. The method according to claim 1, wherein the solvent-exchanged polysaccharide product of step (c) is immersed in at least one further bath of water-miscible organic solvent to effect more complete exchange of organic solvent for water in aid polysaccharide material prior to the drying step (d).

10. The method according claim 1, wherein the water-miscible organic solvent comprises a $C_1$–$C_4$ monohydric alcohol or a $C_3$–$C_6$ ketone.

11. The method according claim 1, wherein said drying step d) is carried out under sub-atmospheric pressure.

12. A substantially insoluble polysaccharide sponge obtained by:
   (a) providing a solution of a soluble polysaccharide in water;
   (b) freezing the solution to form a frozen solution;
   (c) immersing the frozen solution in a water-miscible organic solvent containing a cross-linking agent to exchange said solvent for at least a part of the water in the frozen solution while cross-linking the polysaccharide to render it water insoluble; and
   (d) drying the resulting cross-linked and solvent-exchanged polysaccharide material.

13. The polysaccharide sponge according to claim 12, wherein the soluble polysaccharide is selected from the group consisting of soluble alginates, xanthan gum, guar gum, chitosan, carboxymethyl celluose, hydroxymethyl celluose, hyaluronic acid, pectin and mixtures thereof.

14. The polysaccharide sponge according to claim 12, wherein the soluble polysaccharide comprises at least 75% by weight of one or more alginates.

15. The polysaccharide sponge according to claim 12, wherein the soluble polysaccharide consists of sodium alginate.

16. The method of treating a wound comprising the steps of preparing a substantially water-insoluble polysaccharide sponge and applying the sponge to a wound, wherein the sponge is prepared according to the following steps:
   (a) providing a solution of a soluble polysaccharide in water;
   (b) freezing the solution to form a frozen solution;
   (c) immersing the frozen solution in a water-miscible organic solvent containing a cross-linking agent to exchange said solvent for at least a part of the water in the frozen solution while cross-linking the polysaccharide to render it water insoluble; and
   (d) drying the resulting cross-linked and solvent-exchanged polysaccharide material.

17. The method according to claim 16, wherein the soluble polysaccharide is selected from the group consisting of soluble alginates, xanthan gum, guar gum, chitosan, carboxymethyl cellulose, hydroxymethyl celluose, hyaluronic acid, pectin and mixtures thereof.

18. The method according to claim 16, wherein the soluble polysaccharide comprises at least 75% by weight of one or more alginates.

19. The method according to claim 16, wherein the cross-linking agent is selected from the group consisting of glutaraldehyde, dicyclohexyl carbodiimide, hexamethylene diisocyanate, salts of multivalent cations and salts of multivalent anions.

20. The method according to claim 16, wherein the solvent-exchanged polysaccharide product of step (c) is immersed in at least one further bath of water-miscible organic solvent to effect more complete exchange of organic solvent for water in said polysaccharide material prior to the drying step (d).

21. The method according claim 16, wherein the water-miscible organic solvent comprises a $C_1$–$C_4$ monohydric alcohol or a $C_3$–$C_6$ ketone.

* * * * *

UNITED STATES PATENT AND TRADEMARK OFFICE
CERTIFICATE OF CORRRECTION

PATENT NO. : 5,888,987
DATED : March 30, 1999
INVENTOR(S) : Carla Anne Haynes, et al.

It is certified that error appears in the above-identified patent and that said Letters Patent is hereby corrected as shown below:

On the title page, item [56], insert the following:

FOREIGN PATENT OR PUBLISHED FOREIGN PATENT APPLICATION

|  |  | DOCUMENT NUMBER |  |  |  |  |  |  | PUBLICATION DATE | COUNTRY OR PATENT OFFICE | CLASS | SUBCLASS | TRANSLATION YES | NO |
|---|---|---|---|---|---|---|---|---|---|---|---|---|---|---|
|  | WO | 9 | 4 | 0 | 2 | 0 | 2 | 9 | 03/02/94 | PCT |  |  |  |  |
|  | WO | 9 | 7 | 4 | 4 | 0 | 7 | 0 | 11/27/97 | PCT |  |  |  |  |
|  |  |  |  |  |  |  |  |  |  |  |  |  |  |  |
|  |  |  |  |  |  |  |  |  |  |  |  |  |  |  |
|  |  |  |  |  |  |  |  |  |  |  |  |  |  |  |
|  |  |  |  |  |  |  |  |  |  |  |  |  |  |  |

Signed and Sealed this

Twenty-sixth Day of October, 1999

Attest:

Q. TODD DICKINSON

*Attesting Officer*      *Acting Commissioner of Patents and Trademarks*